(12) United States Patent
Liebmann

(10) Patent No.: US 8,038,435 B2
(45) Date of Patent: Oct. 18, 2011

(54) VENTING DEVICE

(75) Inventor: Ralf Liebmann, Sulzbach (DE)

(73) Assignee: Takata-Petri AG, Aschaffenburg (DE)

( * ) Notice: Subject to any disclaimer, the term of this patent is extended or adjusted under 35 U.S.C. 154(b) by 15 days.

(21) Appl. No.: 12/656,271

(22) Filed: Jan. 22, 2010

(65) Prior Publication Data

US 2010/0127417 A1    May 27, 2010

Related U.S. Application Data

(63) Continuation of application No. PCT/EP2008/058961, filed on Jul. 10, 2008.

(51) Int. Cl.
*B29C 45/34* (2006.01)

(52) U.S. Cl. ......... 425/572; 264/102; 425/577; 425/812

(58) Field of Classification Search .................. 425/572, 425/577, 812; 264/102
See application file for complete search history.

(56) References Cited

U.S. PATENT DOCUMENTS

| | | | |
|---|---|---|---|
| 5,092,759 A * | 3/1992 | Lichtinger et al. ............ | 425/812 |
| 5,397,230 A | 3/1995 | Brew | |
| 5,460,510 A * | 10/1995 | Gellert .......................... | 425/562 |
| 5,997,783 A | 12/1999 | Hunter et al. | |

FOREIGN PATENT DOCUMENTS

| | | |
|---|---|---|
| DE | 2 212 609 A1 | 10/1973 |
| DE | 693 11 728 T2 | 1/1998 |
| DE | 101 53 159 A1 | 5/2003 |
| DE | 698 12 996 T2 | 2/2004 |
| EP | 1 027 198 B1 | 4/2003 |
| FR | 2 857 898 A1 | 1/2005 |
| WO | WO 94/05486 A1 | 3/1994 |

* cited by examiner

*Primary Examiner* — Timothy Heitbrink
(74) *Attorney, Agent, or Firm* — Foley & Lardner LLP

(57) ABSTRACT

A venting device for venting a cavity of an injection mold via a venting opening of the injection mold which cavity can be filled with an injection molding material is provided. The venting device comprising a housing which has a through-opening and is designed and intended for an arrangement on an injection mold in such a way that air which is present in the cavity and which escapes from a venting opening of the injection mold when injection molding material is introduced into the cavity can exhaust through the through-opening of the housing into an exterior space surrounding the injection mold. A valve pin extending longitudinally along a direction of extent and being mounted in the housing movably along its direction of extent. The valve pin is designed for being moved from a venting position, in the direction of the cavity into a first cleaning position.

18 Claims, 1 Drawing Sheet

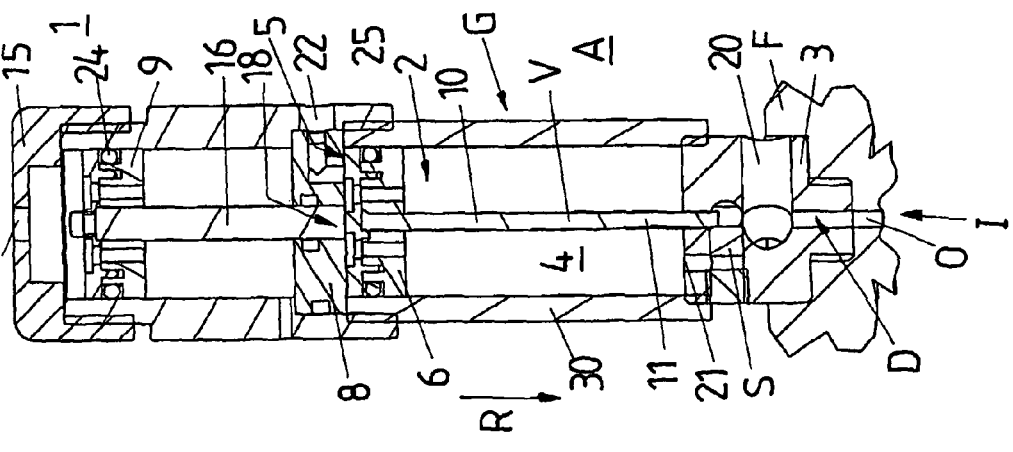
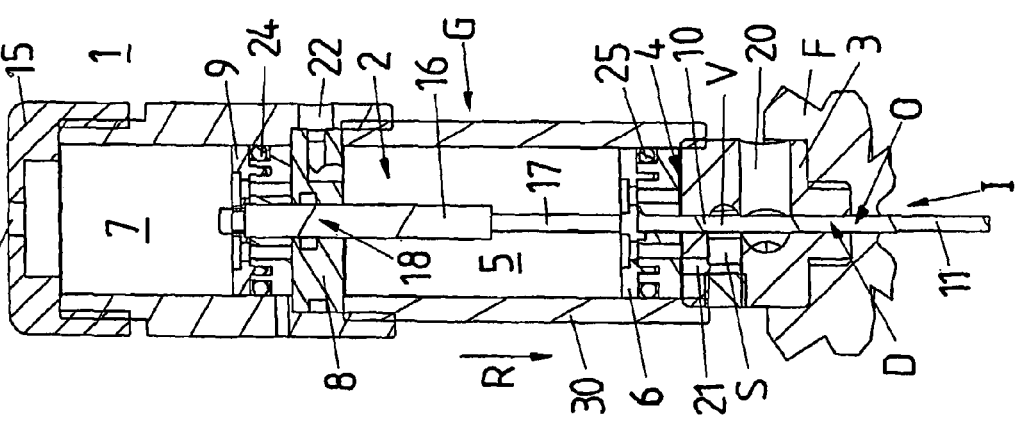
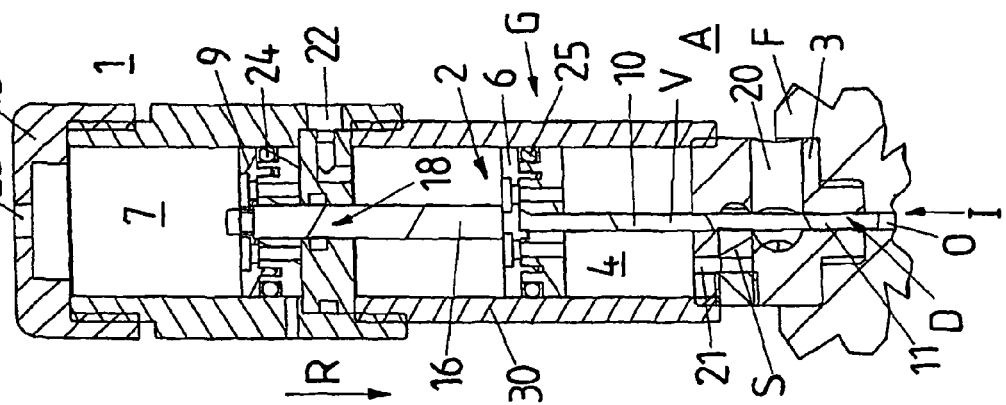

VENTING DEVICE

CROSS-REFERENCE TO RELATED PATENT APPLICATIONS

This application is a Continuation of International Patent Application Number PCT/EP2008/058961, filed on Jul. 10, 2008, which was published in German on Jan. 29, 2009 as WO 2009/013139 A1. The foregoing International Application is incorporated herein by reference in its entirety.

BACKGROUND

The invention relates to a venting device for an injection mold, in particular for foam molds for steering wheels as well as a method for venting such an injection mold.

If an injection molding material is introduced into the cavity of an injection mold in order to manufacture a formed part, the air being present in the cavity and being replaced by the injection molding material has to be released from the cavity through at least one venting opening of the injection mold via which the cavity communicates with an exterior space surrounding the injection mold. In this connection, there exists the problem that injection molding material escapes out of the venting opening together with the air to be released. This burr has to be removed after the solidification of the injection molding material.

FR 2 857 898 discloses a venting device in which in one venting opening or in several venting openings of the cavity a piston is guided in a venting opening with slackness in each case. Air can exhaust along the piston out of the cavity in a venting position of the piston. To subsequently remove material gotten into the venting opening out of the venting opening, the piston can be moved from the venting position in the direction of the cavity. In this manner, the piston pushes material being present in the venting opening back into the cavity. Possibly, material can stick to the piston itself which material gets then again into the venting opening during an anew movement of the piston into the venting position.

DE 101 53 159 A1 discloses a venting device in which a valve pin is movably guided between two end positions in an opening. In the first end position of the valve pin, air can exhaust from an injection mold to atmosphere through ducts provided in the valve pin. To remove injection molding material possibly being present in the ducts of the valve pin before a further injection molding process, the valve pin can be transferred into a second end position. When the valve pin is moved from its first into its second end position, it is guided past an area of the venting device at which injection molding material being present in the ducts of the valve pin is wiped off. Subsequently, the valve pin is again moved into its first end position for venting the injection mold.

SUMMARY

It is an object of the invention to provide a venting device in which the injection molding material burr is reduced and which is ameliorated with respect to above-mentioned venting devices.

According to an exemplary embodiment of the invention, a venting device is provided for venting a cavity of an injection mold via a venting opening of the injection mold which cavity can be filled with an injection molding material, having a housing which has a through-opening and is designed and intended for an arrangement at the injection mold such that air replaced from the cavity which air escapes from the venting opening of the injection mold when injection molding material is introduced into the cavity can exhaust through the through-opening of the housing into an exterior space surrounding the injection mold, having a valve pin extending longitudinally along a direction of extent and being mounted in the housing movably along its direction of extent, wherein the valve pin is designed for being moved from the venting position, in which the valve pin is arranged in the through-opening such that air escaping from the venting opening of the injection mold can escape along the valve pin through the through-opening into the exterior space, in the direction of the cavity into a first cleaning position, wherein injection molding material gotten into the through-opening is taken along by the valve pin and is ejected out of the through-opening, and wherein the valve pin is designed for being moved from the first cleaning position away from the cavity into a second cleaning position, wherein injection molding material sticking to the valve pin is removed from the valve pin by a wiping element provided at the housing.

In other words, a venting device for venting a cavity of an injection mold via a venting opening of the injection mold is provided which cavity can be filled with injection molding material, having a housing which has a through-opening and which is designed and intended for an arrangement at an injection mold, having a valve pin longitudinally extending along a direction of extent and being mounted on the housing movably along its direction of extent. Thereby, the valve pin can be moved from a venting position in which it protrudes into the venting opening of the injection mold so that air escaping from the venting opening can exhaust through the through-opening along the valve pin into an exterior space surrounding the injection mold, in the direction of the cavity into a first cleaning position. In this first cleaning position, a free end section completely protrudes out of the through-opening into the cavity. Further, the valve pin can be moved thereby from the first cleaning position from the cavity away into a second cleaning position, wherein it can be guided past a wiping element provided at the housing.

The injection molding material can be any imaginable substances which can be introduced into a cavity of an injection mold designing a negative form in order to manufacture a formed part corresponding to the negative form. The material is introduced into the cavity in a state capable of flowing and solidifies then to the formed part to be manufactured. The instant venting device is particularly suited for foam forming of steering wheels, in particular of their steering wheel rims.

Exemplary, the valve pin is divided along its direction of extent in a main section and free end section which has a cross-section being reduced with respect to the main section, in particular being flattened, wherein the free end section of the valve pin seizes through the through-opening in the venting position of that valve pin. In this connection, the flattened side forms together with the through-opening a duct through which the air escaping from the cavity is guided into the exterior space. Preferably, the main section has as well as the through-opening (and the venting opening) a circular-shaped cross-section, wherein the flattened side of the end section is formed by a planar surface extending along the plane of extent.

Exemplary, in its venting position the valve pin sticks out—with respect to an intended state of the housing of the venting device arranged at the injection mold—of the through-opening thus far along its direction of extent that its free end section extends into the venting opening, wherein the end section, however, does preferably not extend into the cavity itself along its direction of extent. In a variant of the invention, the valve pin is designed such that its free end section is flush with the venting opening of the injection mold in its venting position, thus that it just does not stand into the cavity.

In case of a valve pin being arranged in the first cleaning position, it is provided that the free end section of the valve pin sticks thus far out of the through-opening along its direction of extent that it is completely arranged in the cavity, wherein the main section of the valve pin is arranged in the through-opening. In order that the main section can remove injection molding material being present in the through-opening while seizing through the through-opening, the main section of the valve pin has at least one area which has a (particularly circular) cross-section corresponding to the through-opening so that injection molding material gotten into the through-opening is pressed out of the through opening by that area when the valve pin is moved from the venting position into the first cleaning position.

Advantageously, the through-opening is designed in a bottom of the housing via which the housing can be fixed to the injection mold, wherein the bottom is preferably designed for a positive-fit attachment at the injection mold. Further, an outlet opening is provided communicating with the through-opening and extending cross the direction of extent and ending out of the injection mold in an intended state of the venting device arranged at the injection mold. Thus, air being present in the cavity can escape via the outlet opening into the exterior space surrounding the injection mold.

At the same time, the outlet opening serves as connection for a pump, in particular a vacuum pump, by means of which air being present in the cavity can be pumped out of the cavity. This can be done prior to filling the cavity with the injection molding material so that the injection molding material can better distribute in the cavity or during the filling of the cavity with injection molding material in order to accelerate the exhaust of air out of the cavity.

In order that the valve pin can be moved completely past the wiping element during movement in its second cleaning position, the end section is, in the second cleaning position of the valve pin, arranged out of the through-opening in an interior space of the housing being defined by the housing. Consequently, the valve pin can then be completely moved past the wiping element with its end section in order to wipe off injection molding material sticking to the end section of the valve pin during movement into the second cleaning position. Preferably, the wiping element is arranged at the housing adjustably cross the direction of extent of the valve pin so that always an optimal attachment of the wiping element, in particular at the free end section of the valve pin, can be achieved.

Exemplary, the venting device is designed and intended for an arrangement at the injection mold such that the through-opening lies congruently along the direction of extent on the venting opening of the injection mold. Hereby, the valve pin can always also be used for cleaning the venting opening of the injection mold.

For the movement of the valve pin between the single positions of the valve pin, a first and a second chamber of the housing are provided which can be separately charged with a flow means and which are separated from each other along the direction of extent by a first sealing element sliding sealingly along the direction of extent in the housing, to which sealing element the valve pin is fixed.

In this context, the first sealing element is exemplary shifted along the direction of extent towards the bottom when the second chamber is charged with a flow means in case of the valve pin being in the venting position, wherein the valve pin is taken along into its first cleaning position.

Further, the housing has a third chamber, which is separated from the second chamber by a intermediate wall extending cross the direction of extent, wherein a second sealing element is guided slidingly along the direction extend in the third chamber which second sealing element is, in the venting position of the valve pin, preferably positioned at the intermediate wall separating the second chamber from the third chamber.

For moving the valve pin from the first cleaning position into the second cleaning position, the first chamber is charged with a flow means so that the first sealing element is displaced along the direction of extent in the direction of the intermediate wall, wherein the valve pin is taken along into its second cleaning position.

To allow a back movement of the valve pin into the venting position, the second sealing element works together with the first sealing element such that the second sealing element is displaced to an upper side of the housing lying opposite the intermediate wall, when the first sealing element is displaced along the direction of extent in the direction of the intermediate wall during charging the first chamber with a flow means in case of a valve pin being in the first cleaning position.

If now the second sealing element is charged with pressure with a flow means from the upper side in the direction of the intermediate wall in case of a valve pin being in the second cleaning position, the first sealing element is shifted from the intermediate wall in the direction of the bottom due to said coupling between the two sealing elements, wherein the valve pin is taken along into its venting position.

The coupling between the two sealing elements is exemplary formed by a sleeve protruding from the second sealing element in the direction of the bottom and by a bolt being slidingly guided in the sleeve along the direction of extent, which bolt protrudes in the direction of the upper side of the housing from the first sealing element, wherein the sleeve seizes through a continuous opening of the intermediate wall being centrally designed at the intermediate wall so that the coupling functions across over the intermediate wall. Exemplary, that opening of the intermediate wall is flush with the through-opening and the venting opening.

Exemplary, the valve pin has a cross-section cross the direction of extent of only 2 mm maximum. Hereby, it is prevented that an impression of the valve pin is generated on the formed part to be manufactured.

According to an other exemplary embodiment of the invention a method for venting the cavity of an injection mold via a venting opening of the injection mold which injection mold can be filled with injection molding material, in particular by using a venting device according to the invention, comprises the following steps: positioning the venting device with respect to the venting opening of the injection mold so that the through-opening communicates with the venting opening of the injection mold, moving the valve pin in its venting position so that air can escape through the venting opening out of the cavity when injection molding material is introduced into the cavity and can exhaust along the valve pin through the through-opening into an exterior space surrounding the injection mold, moving the valve pin in its first cleaning position after the cavity has been filled with injection molding material so that injection molding material gotten into the through-opening is taken along by the valve pin and is ejected out of the through-opening, and moving the valve pin in the second cleaning position, wherein injection molding material sticking to the valve pin is removed from the valve pin by the wiping element.

For charging the chambers with a pressure, compressed air stored in a compressed air source or generated by this compressed air source is exemplary introduced into the chambers. Other flow means, exemplary liquid, are also thinkable. The valve rod can alternatively also be moved in an electro-motor-driven way.

Exemplary, the cavity is also evacuated via the venting device by arranging a pump, e.g., at an outlet opening of the housing of the venting device communication with the through-opening, via which pump air being present in the cavity can be pumped out of the cavity.

A further notion of the invention is providing an arrangement having a venting device according to an exemplary embodiment of the invention and an injection mold adapted thereto as precedingly described, exemplary a foam form for a steering wheel (steering wheel rim), wherein the injection molding material to be introduced into the cavity of the foam form is a foam.

BRIEF DESCRIPTION OF THE DRAWINGS

Further details and advantages of the invention will become clear with the subsequent description of exemplary embodiments by means of the Figures.

FIG. 1 shows a cut view of a venting device according to the invention for venting a cavity of an injection mold via a venting opening of the injection mold, having a valve pin guided in a through-opening of the venting device, which valve pin is arranged in a venting position so that air replaced from the cavity and escaping out of the venting opening can exhaust along the valve pin through the through-opening out of the cavity.

FIG. 2 shows a further cut view of the venting device shown in FIG. 1, wherein the valve pin is arranged in a first cleaning position in which the valve pin protrudes into the cavity to be vented.

FIG. 3 shows a further cut view of the venting device shown in FIGS. 1 and 2, wherein the valve pin is arranged in a second cleaning position in which the valve pin is completely extracted out of the through-opening for wiping-off at a wiping element.

DETAILED DESCRIPTION

FIG. 1 shows in connection with FIGS. 2 and 3 a cut view of the venting device 1 which serves for venting a cavity I of a injection mold F via a venting opening O of the injection mold F, which cavity I is surrounded by the injection mold F, through which venting device 1 air can exhaust from the cavity I into an exterior space A surrounding the injection mold F.

The venting device 1 has a housing G as a support of the venting mechanism which housing G is designed and intended to be fixed at the injection mold F to be vented. The housing G is designed longitudinally extended along a direction of extent R and has a wall 30 which extends along the direction of extent R between a bottom 3, which is designed for an attachment at the injection mold F and extends cross the direction of extent R, and an upper side 15 of the housing G, which extends cross the direction of extent R. The wall 30 can be designed in particular hollow-cylinder shaped.

The bottom 3 of the housing G is designed for a form-fitting arrangement in a recess of the injection mold F, the bottom 3 can in particular be screwed into that recess or can be fixed therein in any other way, respectively.

A through-opening D is designed in the bottom 3, which through-opening D extends along the direction of extent R and is arranged congruently with a venting opening O of the injection mold F in the intended state of the venting device 1 or the housing G, respectively, arranged at the injection mold F. Thereby, the through-opening D is flush with the venting opening O of the injection mold F. Thus, air being replaced from the cavity I can escape through the venting opening O out of the cavity I, wherein that air directly reaches the through-opening D extending along the direction of extent R. The through-opening D is connected to a sack-like outlet opening 20 extending across the direction of extent R and being provided at the bottom 3, which outlet opening 20 ends at the housing G out of the cavity I in the intended state of the venting device 1 arranged at the injection mold F so that air exhausting out of the venting opening O of the cavity I can be guided via the through-opening D (and the outlet opening 20) into an exterior space A surrounding the injection mold F. The through-opening D can of course also be connected in another way with the exterior space A.

In order that injection molding material being introduced into the cavity I cannot also escape through the through-opening D out of the venting opening O of the cavity I, a cylindric valve pin V longitudinally extending along the direction of extent R is provided, having a flattened free end section 11 which goes off a main section 10 of the valve pin V being circular-shaped in cross-section. The valve pin V is mounted movably along its direction of extent R in the housing G and can be moved by means of a movement generating device along the direction of extent R, wherein the valve pin V is positioned in a venting position such that the free flattened end section 11 of the valve pin V seizes through the through-opening D, the inner diameter of which corresponds to the outer diameter of the main section 10 of the valve pin V. Thereby, the end section 11 forms with the through-opening D a narrow duct, through which air can exhaust along the end section 11 out of the venting opening O of the cavity I (via the outlet opening 20), however no injection molding material. In the venting position, the free end section 11 of the valve pin V further sticks into the venting opening O so that in particular no injection molding material burr (gear cluster) can occur at the venting opening O (cf. FIG. 1).

However, injection molding material can get into the through-opening D in small amounts along the flattened area of the free end section 11 and thereby can also remain stuck to the free end section 10 of the valve pin V.

Therefore, it is mandatory to clean the through-opening D (optionally also the venting opening O) as well as the valve pin V. In doing so, the valve pin V is being moved by means of the movement generating device along the direction of extent R out of the housing G into a first cleaning position in which the end section 11 of the valve pin V is arranged completely in the cavity I so that the main section 10 of the valve pin V seizes through the through-opening D as well as through the venting opening O. Since the main section 10 has a diameter (or an according cross-section area, respectively) corresponding to the through-opening D (and the congruent venting opening O), the main section 10 takes along injection molding material being present in the through-opening D when the valve pin V is moved into the first cleaning position and thus cleans the through-opening D (cf. FIG. 2).

For cleaning the valve rod V itself, the valve rod V is afterwards being retracted into the housing G into a second cleaning position, namely beyond the venting position so that a free end of the end section 11 of the valve pin V is arranged along the direction of extent R at a distance to the through-opening D. This makes it possible to completely move the flattened side of the end section 11 of the valve pin V past a wiping element S when the valve pin V is moved into its second cleaning position so that injection molding material sticking to the end section 11 is wiped off the end section 11 of the valve pin V when the valve pin V is retracted into the second cleaning position. The wiping element S is designed adjustably cross the direction of extent R and readjusts itself automatically in case of abrasion so that the wiping off of injection molding material sticking to the valve pin V is assured. Hereby, the wiping element S can be pre-tensioned against the valve pin V by a spring means.

A movement generating device for moving the valve pin V between the previously described positions is formed by three chambers 4, 5, 7 of the housing G which can be separately charged by a flow means, particularly by compressed air.

To move the valve pin V from the venting position into the first and second cleaning position, the first and the second chamber 4, 5 of the housing G are provided which are separated from each other by a first sealing element 6. Thereto, the first sealing element 6 is designed to slide along the direction of extent R at an inner side of the wall 30 facing the interior space of the housing G, wherein the first sealing element 6 is guided through the wall 30 along the direction of extent R. To seal the first chamber 4 against the second chamber 5, a sealing ring 25 is provided at the first sealing element 6 which sealing ring 25 runs circumferentially around that sealing element 6 and which runs around at the first sealing element 6 in a groove of the first sealing element 6 cross the direction of extent R and lies sealingly against the inner side of the wall 30.

The first chamber 4 adjoins the bottom 3; the second chamber 5 lies on that side of the first sealing element 6 facing away the bottom 3. By introducing a flow means into the second chamber 5 through an inlet opening 22 assigned to the second chamber 5 and provided at the wall 30, the first sealing element 6 is pressurized and, as a consequence, displaced in the direction of the bottom 3 until it butts the bottom 3. Thereby, the valve pin V is secured via its main section 10 to the first sealing element 6 such that it is taken along into its first cleaning position when the first sealing element 6 is displaced.

Afterwards, the first chamber 4 being compressed onto an evanescent volume is pressurized by introducing a flow means through an inlet opening 21 of the housing G being assigned to the first chamber 4 so that the first sealing element 6 is displaced along the direction of extent R in the direction of an intermediate wall 8 of the housing until the first sealing element 6 butts that intermediate wall 8. Thereby, the valve pin V is taken along into the second cleaning position. The intermediate wall 8 extends cross the direction of extent R and separates the third chamber 7 from the second chamber 5.

The third chamber 7 serves for moving back the valve pin V from the second cleaning position into the venting position. Therein, a second sealing element 9 is provided which is designed to glide along the direction of extent R along the inner side of the wall 30 facing the interior space of the housing G, wherein the second sealing element 9 is guided through the wall 30 along the direction of extent R. A circumferential sealing ring 24 is provided at the second sealing element 9 for a sealing attachment of the second sealing element 9 at the wall 30, which sealing ring 24 runs circumferentially at the second sealing element 9 in a grove of the second sealing element 9 cross the direction of extent R.

The second sealing element 9 is coupled with a first sealing element 6 by a sleeve 16 sticking out of the second sealing element 9 along the direction of extent R in the direction of the intermediate bottom 8, which sleeve 16 is guided into the second chamber 5 through an opening 18 of the intermediate wall 8 being flush with the through-opening D, wherein a bolt 17 sticking out of the first sealing element 6 in the direction of the second sealing element 9 is guided movably in the sleeve 16.

The length of the of the sleeve 16 along the direction of extent R is now dimensioned such that the first sealing element 6 abuts upon the sleeve 16 during its movement in the direction of the intermediate wall 8 and thus takes along the second sealing element 9 when the valve pin V is moved into the second cleaning position, wherein the second sealing element 9 reaches the upper side 15 of the housing G for lying against it, when the first sealing element 6 butts the intermediate wall 8 from the bottom 3.

To move the valve pin V from the second cleaning position back into the venting position, now only the third chamber 7 has to be filled with a flow means through an inlet opening 23 of the housing G being assigned to the third chamber 7. Thereby, the inlet opening 23 being assigned to the third chamber 7 is arranged such that a flow means being introduced through the inlet opening 23 pressurizes that side of the second sealing element 9 which faces the upper side 15 of the housing G so that the second sealing element 9 is displaced along the direction of extent R towards the intermediate wall 8 until it butts this intermediate wall 8. In this connection, the sleeve 16 presses the first sealing element 6 in the direction of the bottom 3, wherein the valve pin V is taken along into the venting position. After this displacement of the first sealing element 6, the first and the second chamber 4, 5 again have a volume of a comparable order of magnitude. When the second chamber 5 is again pressurized, the valve pin V is again moved into the first cleaning position, as described above.

The priority application, German Patent Application No. 10 2007 035 386.5, filed Jul. 26, 2007, including the specification, drawings, claims and abstract, is incorporated herein by reference in its entirety.

What is claimed is:

1. A venting device for venting a cavity of an injection mold via a venting opening of the injection mold which cavity can be filled with an injection molding material, having
a housing which has a through-opening and is designed and intended for an arrangement on an injection mold in such a way that air which is present in the cavity and which escapes from a venting opening of the injection mold when injection molding material is introduced into the cavity can exhaust through the through-opening of the housing into an exterior space surrounding the injection mold,
a valve pin extending longitudinally along a direction of extent and being mounted in the housing movably along its direction of extent,
wherein the valve pin is designed for being moved from a venting position, in which the valve pin is arranged in the through-opening in such a way that air escaping from the venting opening of the injection mold can exhaust into the exterior space along the valve pin through the through-opening, in the direction of the cavity into a first cleaning position, with injection molding material gotten into the through-opening being taken along by the valve pin and being transported out of the through-opening,
wherein the valve pin is designed for being moved from the first cleaning position away from the cavity into a second cleaning position, with injection molding material sticking to the valve pin being wiped off the valve pin by a wiping element provided on the housing.

2. The venting device according to claim 1, wherein the valve pin is divided along its direction of extent into a main section and a free end section which has a reduced cross-section with respect to the main section.

3. The venting device according to claim 2, wherein the free end section is arranged in the through-opening in the venting position of the valve pin.

4. The venting device according to claim 2, wherein the valve pin is—with respect to an intended state of the venting device arranged at the injection mold—designed such that it sticks out of the through-opening thus far along its direction of extension that its free end section is arranged in the venting opening.

5. The venting device according to claim 2, wherein the free end section does not—with respect to an intended state of the venting device arranged at the injection mold—extend into the cavity in the venting position of the valve pin.

6. The venting device according to claim 4, wherein the valve pin is—with respect to an intended state of the venting device arranged at the injection mold—designed such that, in its venting position, its free end section is flush with the venting opening of the injection mold.

7. The venting device according to claim 2, wherein the free end section of the valve pin sticks in its first cleaning position—with respect to an intended state of the venting device arranged at the injection mold—out of the through-opening thus far along its direction of extent that it is completely arranged in the cavity.

8. The venting device according to claim 2, wherein the main section of the valve pin has at least one area which is moved through the through-opening during the movement of the valve pin into the first cleaning position, wherein the at least one area has a cross-section corresponding to the through-opening.

9. The venting device according to claim 1, wherein the through-opening is formed in a bottom of the housing via which the housing can be fixed particularly at the injection mold.

10. The venting device according to claim 9, wherein an outlet opening communicating with the through-opening and extending across the direction of extent is designed at the bottom which outlet opening ends out of the cavity in an intendedly arranged state of the venting device at the injection mold.

11. The venting device according to claim 2, wherein the valve pin is designed to be moved with its end section completely past the wiping element during the movement into the second cleaning position to wipe off injection molding material sticking to the end section of the valve pin.

12. The venting device according to claim 1, wherein the housing comprising a first and a second chamber which can be charged with a flow means and which are separated from each other by a first sealing element guided slidingly in the housing along the direction of extent.

13. The venting device according to claim 12, wherein the valve pin is secured to the first sealing element.

14. The venting device according to claim 13, wherein the first sealing element is displaced along the direction of extent towards the bottom in case of a valve pin being in the venting position during charging the second chamber with a flow means, wherein the valve pin is taken along into its first cleaning position.

15. The venting device according to claim 13, wherein the housing comprising a third chamber which is separated from the second chamber by an intermediate wall, wherein a second sealing element is guided slidingly along the direction of extent in the third chamber.

16. The venting device according to claim 12, wherein the first sealing element is displaced along the direction of extent in the direction of the intermediate wall in case of a valve pin being in the first cleaning position during charging the first chamber with a flow means, wherein the valve pin is taken along into its second cleaning position.

17. The venting device according to claim 12, wherein the second sealing element is coupled to the first sealing element in such a way that the second sealing element is displaced towards an upper side of the housing lying along the direction of extent opposite the intermediate wall, when the first sealing element is displaced along the direction of extent in the direction of the intermediate wall in case of a valve pin being in the first cleaning position during charging the first chamber with a flow means.

18. The venting device according to claim 12, wherein the second sealing means is displaced from the upper side in the direction of the intermediate wall in case of a valve pin being in the second cleaning position during charging the third chamber with a flow means, wherein the first sealing element is displaced from the intermediate wall in the direction of the bottom due to the coupling between the two sealing elements so that the valve pin in taken along into its venting position.

* * * * *